(12) United States Patent
Taffet et al.

(10) Patent No.: US 11,085,305 B2
(45) Date of Patent: *Aug. 10, 2021

(54) LOST CORE STRUCTURAL FRAME

(71) Applicant: Raytheon Technologies Corporation, Farmington, CT (US)

(72) Inventors: Steven Taffet, South Windsor, CT (US); Brandon S. Donnell, Hartford, CT (US); Daniel C. Nadeau, Wethersfield, CT (US); Russell Deibel, Glastonbury, CT (US); San Quach, East Hartford, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 69 days.

This patent is subject to a terminal disclaimer.

(21) Appl. No.: 16/415,199

(22) Filed: May 17, 2019

(65) Prior Publication Data

US 2020/0291790 A1 Sep. 17, 2020

Related U.S. Application Data

(62) Division of application No. 15/039,918, filed as application No. PCT/US2014/066495 on Nov. 20, 2014, now Pat. No. 10,370,980.

(Continued)

(51) Int. Cl.
*F01D 9/04* (2006.01)
*F01D 5/18* (2006.01)
(Continued)

(52) U.S. Cl.
CPC ............... *F01D 5/187* (2013.01); *B22C 7/02* (2013.01); *B22C 9/04* (2013.01); *B22C 9/10* (2013.01);
(Continued)

(58) Field of Classification Search
None
See application file for complete search history.

(56) References Cited

U.S. PATENT DOCUMENTS 2,844,855 A 7/1958 Gadd et al.
4,321,010 A 3/1982 Wilkinson et al.
(Continued)

FOREIGN PATENT DOCUMENTS

CA 2957481 A1 * 8/2017 ............. F01D 5/187

OTHER PUBLICATIONS

European Search Report for EP Application No. 14883263.7 dated Jul. 26, 2017.
(Continued)

*Primary Examiner* — Michael Lebentritt
(74) *Attorney, Agent, or Firm* — Carlson, Gaskey & Olds, P.C.

(57) ABSTRACT

A lost core mold component comprises a first leg and a second leg with a plurality of crossover members connecting the first and second legs. The plurality of crossover members includes outermost crossover members spaced from each other. Adjacent ends of each of the first and second legs, and second crossover members are spaced closer to each other than are the outermost crossover members. Central crossover members extend between the first and second leg and between the second crossover members. The outermost crossover members extend for a first cross-sectional area. The second crossover members extend for a second cross-sectional area and the central crossover members extend for a third cross-sectional area. The first cross-sectional area is greater than the second cross-sectional area. The second cross-sectional area is greater than the third cross-sectional area. A gas turbine engine and component are also disclosed.

20 Claims, 5 Drawing Sheets

Related U.S. Application Data

(60) Provisional application No. 61/919,846, filed on Dec. 23, 2013.

(51) Int. Cl.
   *B22C 9/10* (2006.01)
   *B22C 7/02* (2006.01)
   *B22C 9/04* (2006.01)
   *B22C 9/24* (2006.01)
   *F01D 25/12* (2006.01)

(52) U.S. Cl.
   CPC .............. *B22C 9/24* (2013.01); *F01D 9/041* (2013.01); *F01D 25/12* (2013.01); *F05D 2220/323* (2013.01); *F05D 2230/21* (2013.01); *F05D 2230/211* (2013.01); *F05D 2240/121* (2013.01); *F05D 2240/122* (2013.01); *F05D 2240/303* (2013.01); *F05D 2240/304* (2013.01); *F05D 2260/202* (2013.01); *Y02T 50/60* (2013.01)

(56) References Cited

U.S. PATENT DOCUMENTS

| | | |
|---|---|---|
| 4,384,607 A | 5/1983 | Wood et al. |
| 4,434,835 A | 3/1984 | Willgoose |
| 5,337,805 A | 8/1994 | Green et al. |
| 5,511,309 A * | 4/1996 | Beabout ............... F01D 5/187 29/889.72 |
| 5,599,166 A * | 2/1997 | Deptowicz ............ B22C 9/04 164/369 |
| 5,810,552 A | 9/1998 | Frasier |
| 5,853,044 A | 12/1998 | Wheaton et al. |
| 5,950,705 A | 9/1999 | Huang |
| 5,951,256 A | 9/1999 | Dietrich |
| 6,340,047 B1 | 1/2002 | Frey |
| 6,364,001 B1 | 4/2002 | Cross |
| 6,626,230 B1 | 9/2003 | Woodrum et al. |
| 6,929,054 B2 | 8/2005 | Beals et al. |
| 6,932,571 B2 | 8/2005 | Cunha et al. |
| 7,172,012 B1 | 2/2007 | Memmen |
| 7,306,026 B2 | 12/2007 | Memmen |
| 7,469,739 B2 | 12/2008 | Otero et al. |
| 7,699,583 B2 | 4/2010 | Cunha |
| 7,780,414 B1 | 8/2010 | Liang |
| 8,302,668 B1 | 11/2012 | Bullied et al. |
| 9,243,502 B2 | 1/2016 | Xu |
| 9,296,039 B2 | 3/2016 | Propheter-Hinckley et al. |
| 9,314,838 B2 | 4/2016 | Pointon et al. |
| 9,579,714 B1 | 2/2017 | Rutkowski |
| 10,018,052 B2 | 7/2018 | Snyder et al. |
| 10,036,258 B2 | 7/2018 | Mongillo et al. |
| 10,081,052 B2 | 9/2018 | Wilson et al. |
| 10,370,980 B2 * | 8/2019 | Taffet ................. F01D 5/187 |
| 2005/0258577 A1 | 11/2005 | Holowczak et al. |
| 2006/0048914 A1 | 3/2006 | Wiedemer et al. |
| 2006/0133936 A1 * | 6/2006 | Papple ................. F01D 5/187 416/97 R |
| 2007/0068649 A1 | 3/2007 | Verner et al. |
| 2007/0201980 A1 | 8/2007 | Morris et al. |
| 2007/0221359 A1 | 9/2007 | Reilly |
| 2008/0008599 A1 | 1/2008 | Cunha et al. |
| 2008/0110024 A1 | 5/2008 | Reilly et al. |
| 2008/0131285 A1 | 6/2008 | Albert et al. |
| 2008/0135721 A1 | 6/2008 | Wang et al. |
| 2008/0169412 A1 | 7/2008 | Snyder et al. |
| 2008/0181774 A1 | 7/2008 | Cunha |
| 2008/0190582 A1 | 8/2008 | Lee et al. |
| 2009/0074575 A1 * | 3/2009 | Propheter-Hinckley ............ F01D 5/186 416/95 |
| 2011/0132564 A1 | 6/2011 | Merrill et al. |
| 2011/0293434 A1 | 12/2011 | Lee et al. |
| 2011/0315336 A1 | 12/2011 | Snyder et al. |
| 2012/0027616 A1 | 2/2012 | Merrill et al. |
| 2012/0168108 A1 | 7/2012 | Farris et al. |
| 2013/0068415 A1 | 3/2013 | Lutjen et al. |
| 2013/0139990 A1 | 6/2013 | Appleby et al. |
| 2013/0199749 A1 | 8/2013 | Moschini et al. |
| 2013/0333855 A1 | 12/2013 | Merrill et al. |
| 2014/0102656 A1 | 4/2014 | Propheter-Hinckley et al. |
| 2014/0112799 A1 * | 4/2014 | Lee .................. F01D 5/187 416/97 R |
| 2014/0271129 A1 | 9/2014 | Mueller et al. |
| 2015/0040582 A1 * | 2/2015 | Dong ................. F01D 5/187 60/806 |
| 2015/0132139 A1 | 5/2015 | Tran et al. |
| 2015/0159489 A1 * | 6/2015 | Lee .................. F01D 5/189 416/97 R |
| 2015/0184518 A1 | 7/2015 | Lee |
| 2015/0345304 A1 | 12/2015 | Mongillo et al. |
| 2016/0024936 A1 * | 1/2016 | Corcoran ............. F01D 5/186 416/95 |
| 2016/0158834 A1 | 6/2016 | J. et al. |
| 2016/0346831 A1 | 12/2016 | Snyder et al. |
| 2017/0022822 A1 * | 1/2017 | Taffet ................. B22C 9/10 |
| 2017/0058678 A1 * | 3/2017 | Lee .................. F01D 5/147 |
| 2017/0211392 A1 | 7/2017 | Lutjen et al. |
| 2018/0050386 A1 | 2/2018 | Tallman |
| 2018/0073373 A1 | 3/2018 | Paquin et al. |
| 2018/0161852 A1 | 6/2018 | McCarren et al. |
| 2018/0161859 A1 | 6/2018 | Garay et al. |
| 2018/0178274 A1 | 6/2018 | Cogneras et al. |
| 2018/0185913 A1 | 7/2018 | Tallman |
| 2018/0209286 A1 * | 7/2018 | Spangler ............. F01D 5/186 |
| 2019/0186273 A1 * | 6/2019 | Halfmann ............. F01D 5/187 |
| 2019/0383145 A1 * | 12/2019 | Bales ................. B24C 1/045 |
| 2020/0024966 A1 * | 1/2020 | Craig, III ........... B22F 5/04 |
| 2020/0080425 A1 * | 3/2020 | Weaver ............... B32B 18/00 |
| 2020/0182069 A1 * | 6/2020 | Spangler ............. F01D 5/186 |

OTHER PUBLICATIONS

International Search Report and Written Opinion for International Application No. PCT/US2014/066495 dated Sep. 2, 2015.

International Preliminary Report on Patentability for International Application No. PCT/US2014/066495 dated Jul. 7, 2016.

\* cited by examiner

LOST CORE STRUCTURAL FRAME

CROSS-REFERENCE TO RELATED APPLICATIONS

This application is a continuation of U.S. patent application Ser. No. 15/039,918, filed May 27, 2016, now U.S. Pat. No. 10,370,980 granted Aug. 6, 2019, which is a National Phase of International Application No. PCT/US2014/066495, filed Nov. 20, 2014 which claims priority to United States Provisional Patent Application No. 61/919,846, filed Dec. 23, 2013.

STATEMENT REGARDING FEDERALLY SPONSORED RESEARCH OR DEVELOPMENT

This invention was made with government support under Contract No. N00019-02-C-3003, awarded by the United States Navy. The Government has certain rights in this invention.

BACKGROUND OF THE INVENTION

This application relates to a lost core for forming cooling channels in a gas turbine engine component airfoil.

Gas turbine engines are known and, typically, include a fan delivering air into a bypass duct as propulsion air and into a core engine, where it reaches a compressor. The air is compressed and delivered into a combustion section. The air is mixed with fuel and ignited and products of this combustion pass downstream over turbine rotors driving them to rotate.

The products of combustion are extremely hot and, thus, there are challenges to airfoil durability in the turbine section. As an example, the turbine rotors carrying rotating blades that have airfoils. In addition, there are static vanes having airfoils intermediate stages of the rotating blades. It is known to provide cooling air to internal channels within these airfoils.

An airfoil typically extends from a leading edge to a trailing edge. Cooling channels are provided at the trailing and leading edges.

Internal cooling channels may be formed by a lost core mold techniques. In such technique, a lost core is made which essentially follows the contours of the desired cooling channels. That lost core is placed within a mold and molten metal is molded around the lost core. The lost core is then leached out leaving a hollow cavity within the solidified metal airfoil.

In one application of lost cores, there is a first leg forming a cooling channel adjacent to at least one of the leading and trailing edges. Crossover holes connect this channel to a channel spaced from the leading or trailing edge. These crossover holes are formed by crossover members on the core. To prevent breakage to the core during the molding process and leading up to the molding process, the extreme end crossover members are formed to be of greater cross-sectional area. Such crossover members are called frames.

However, the frames have not always provided sufficient strength and prevention of damage.

SUMMARY OF THE INVENTION

In a featured embodiment, a lost core mold component comprises a first leg and a second leg with a plurality of crossover members connecting the first and second legs. The plurality of crossover members includes outermost crossover members spaced from each other. Adjacent ends of each of the first and second legs, and second crossover members are spaced closer to each other than are the outermost crossover members. Central crossover members extend between the first and second leg and between the second crossover members. The outermost crossover members extend for a first cross-sectional area. The second crossover members extend for a second cross-sectional area and the central crossover members extend for a third cross-sectional area. The first cross-sectional area is greater than the second cross-sectional area. The second cross-sectional area is greater than the third cross-sectional area.

In another embodiment according to the previous embodiment, a ratio of the first cross-sectional area to the second cross-sectional area to the third cross-sectional area is 3:2:1.

In another embodiment according to any of the previous embodiments, the lost core member is further provided with pins to form film cooling holes.

In another embodiment according to any of the previous embodiments, the lost core member is utilized to form two cooling channels adjacent at least one of a leading and trailing edge in an airfoil which is to be molded around the lost core member.

In another embodiment according to any of the previous embodiments, the lost core member is utilized to form two cooling channels adjacent the leading edge.

In another embodiment according to any of the previous embodiments, there are intermediate hollows between the outermost crossover members and the second crossover members, and between the second members and the central crossover members, and between individual ones of the central crossover members.

In another embodiment according to any of the previous embodiments, the hollows extend for a cross-sectional area that is less than the first and the second cross-sectional area.

In another embodiment according to any of the previous embodiments, the lost core member is further provided with pins to form film cooling holes.

In another embodiment according to any of the previous embodiments, the lost core member is utilized to form two cooling channels adjacent at least one of a leading and trailing edge in an airfoil which is to be molded around the lost core member.

In another featured embodiment, a gas turbine engine component having an airfoil comprises an airfoil extending between a leading edge and a trailing edge. There is a first and second cooling channel with the first cooling channel being spaced closest to one of the leading and trailing edges and the second channel being spaced from the first channel relative to the one of the leading and trailing edges. Crossover holes connect the first and second cooling channels. The plurality of crossover holes include outermost crossover holes spaced from each other. Adjacent ends of each of the first and second cooling channels, and second crossover holes are spaced closer to each other than are the outermost crossover holes. Central crossover holes extend between the first and second cooling channels and between the second crossover holes. The outermost crossover holes extend for a first cross-sectional area. The second crossover holes extend for a second cross-sectional area and the central crossover holes extend for a third cross-sectional area. The first cross-sectional area is greater than the second cross-sectional area and the second cross-sectional area is greater than the third cross-sectional area.

In another embodiment according to the previous embodiment, a ratio of the first cross-sectional area to the second cross-sectional area to the third cross-sectional area is 3:2:1.

In another embodiment according to any of the previous embodiments, film cooling holes extend from the first cooling channel through a skin of the component.

In another embodiment according to any of the previous embodiments, at least one of the leading and trailing edge is the leading edge.

In another embodiment according to any of the previous embodiments, there are intermediate connectors between the outermost crossover holes and the crossover holes, and between the second crossover holes and the central crossover holes, and also between individual ones of the central crossover holes.

In another embodiment according to any of the previous embodiments, the connectors extend for a cross-sectional area that is less than the first and the second cross-sectional area.

In another embodiment according to any of the previous embodiments, a gas turbine engine comprises a compressor section and a turbine section. The turbine section includes rotors carrying rotating blades and static airfoils with at least one of the rotating blades. The static airfoils include an airfoil extending between a leading edge and a trailing edge. There is a first and second cooling channel with the first cooling channel being spaced closest to one of the leading and trailing edges. The second channel is spaced from the first channel relative to the one of the leading and trailing edges. Crossover holes are formed between the first and second cooling channels. A first leg and a second leg with a plurality of crossover members connect the first and second legs. The plurality of crossover members include outermost crossover members spaced from each other. Adjacent ends of each of the first and second legs, and second crossover members are spaced closer to each other than are the outermost crossover members. The central crossover members extend between the first and second leg and between the second crossover members. The outermost crossover members extend for a first cross-sectional area. The second crossover members extend for a second cross-sectional area and the central crossover member extends for a third cross-sectional area. The first cross-sectional area is greater than the second cross-sectional area and the second cross-sectional area is greater than the third cross-sectional area.

In another embodiment according to the previous embodiment, a ratio of the first cross-sectional area to the second cross-sectional area to the third cross-sectional area is 3:2:1.

In another embodiment according to any of the previous embodiments, at least one of the leading and trailing edge is the leading edge.

In another embodiment according to any of the previous embodiments, there are intermediate connectors between the outermost crossover holes and the second crossover holes, and between the second crossover holes and the central crossover holes, and also between individual ones of the central crossover holes.

In another embodiment according to any of the previous embodiments, the connectors extend for a cross-sectional area that is less than the first and the second cross-sectional area.

These and other features may be best understood from the following drawings and specification.

DETAILED DESCRIPTION

Figure 1:
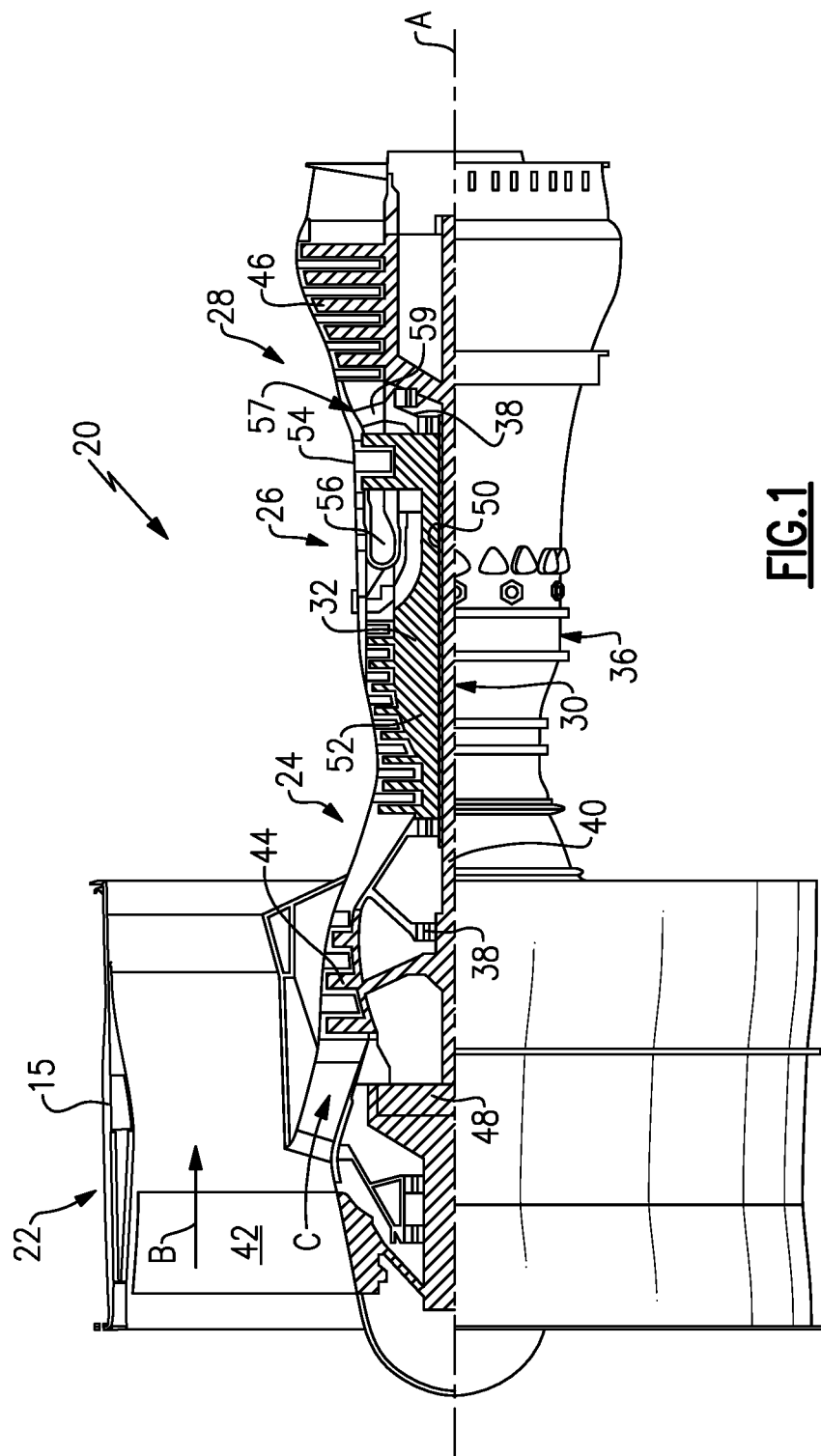
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ ^\circ\ R)/(518.7^\circ\ R)]^{0.5}$. The "Low corrected fan tip speed" as disclosed herein according to one non-limiting embodiment is less than about 1150 ft/second.

Figure 2:
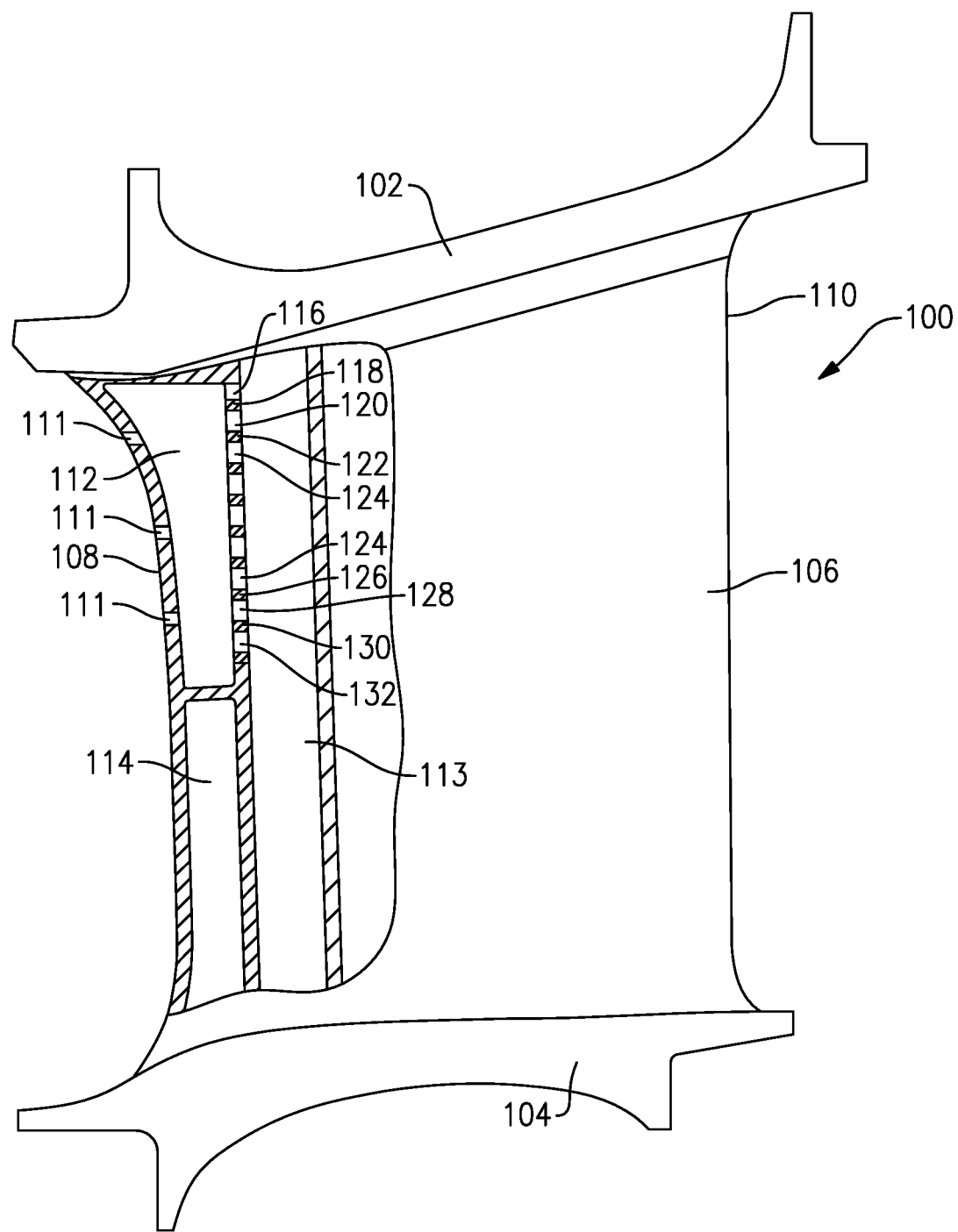
FIG. 2 shows a first component.

FIG. 2 shows a vane 100 which may be incorporated into the turbine section of engine 20 of FIG. 1. Vane 100 includes an airfoil 106 extending from a leading edge 108 to a trailing edge 110. The airfoil 106 also extends between platforms 102 and 104.

A cooling channel 112 is formed adjacent the leading edge 108. While the cooling channel 112 is shown adjacent the leading edge 108, the teachings of this application may also extend to cooling channels formed adjacent the trailing edge 110.

A second cooling channel 113 is formed spaced from the leading edge 108 relative to the channel 112. Crossover holes 116, 120, 124, 128 and 132 communicate air from the channel 113 into the channel 112. Outlet holes 111 may communicate the channel 112 through an outer skin of the airfoil 106 for skin cooling.

Intermediate solid connectors 118, 122, 126 and 130 extend into an outer plane of FIG. 2 and provide a solid connection between opposed walls, not illustrated.

As can be appreciated from FIG. 2, the crossover hole 116 is of a greater dimension measured between the platforms 102 and 104 than the other crossover hole. This could be defined as a radial dimension along a radial dimension R. The crossover hole 120 does not extend as far as the hole 116, but extends for a greater cross-sectional area than the holes 124. Hole 120 extends for a cross-sectional area similar to that of 128. Hole 116 may extend for a similar cross-sectional area as that of hole 132.

In embodiments, the holes 116 and 132 may extend for three times the cross-sectional area of the holes 124. The holes 120 and 128 may extend for twice the cross-sectional area of holes 124.

Figure 3:
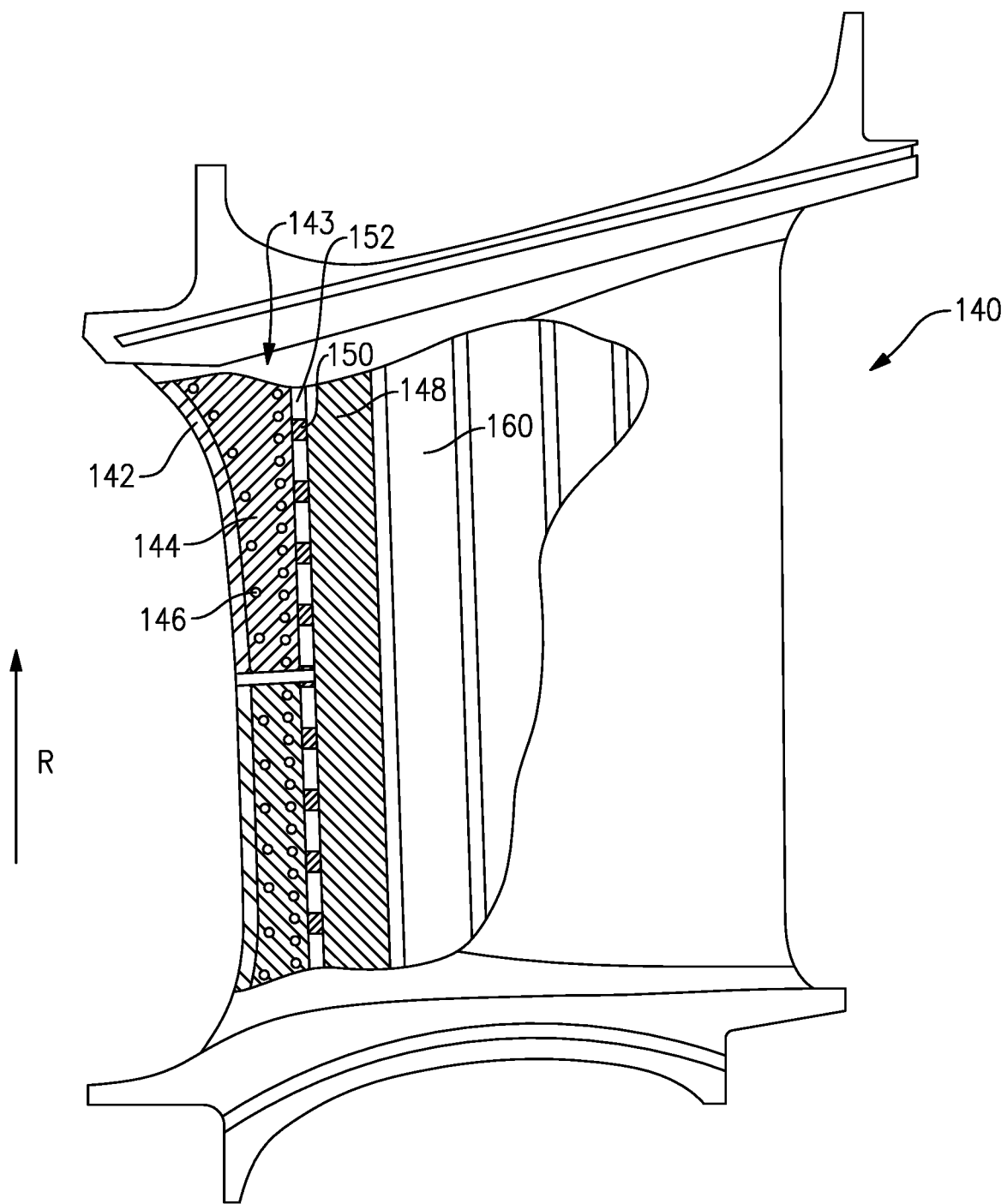
FIG. 3 shows a molding intermediate step.

FIG. 3 shows an intermediate molded product 140. A lost core 143 includes a first leg 144 and crossover members, or frames, 150 connecting the first leg 144 to a second leg 148. As known, the lost core will be leached away, leaving cooling channels. The dimension of the crossover members 150 is not to scale in this Figure, but, rather, can be best understood from FIGS. 4A and B (described below). Pins 146 form the film cooling holes (such as 111) through the skin 142 of the airfoil. Additional lost core molds 160 form other cooling channels. Portions 152 intermediate the crossover members receive molten metal when the component is molded around the lost core elements.

Subsequent to the step of FIG. 3, the lost core 143 is leached away leaving the hollow structure as shown in FIG. 2.

Figure 4:
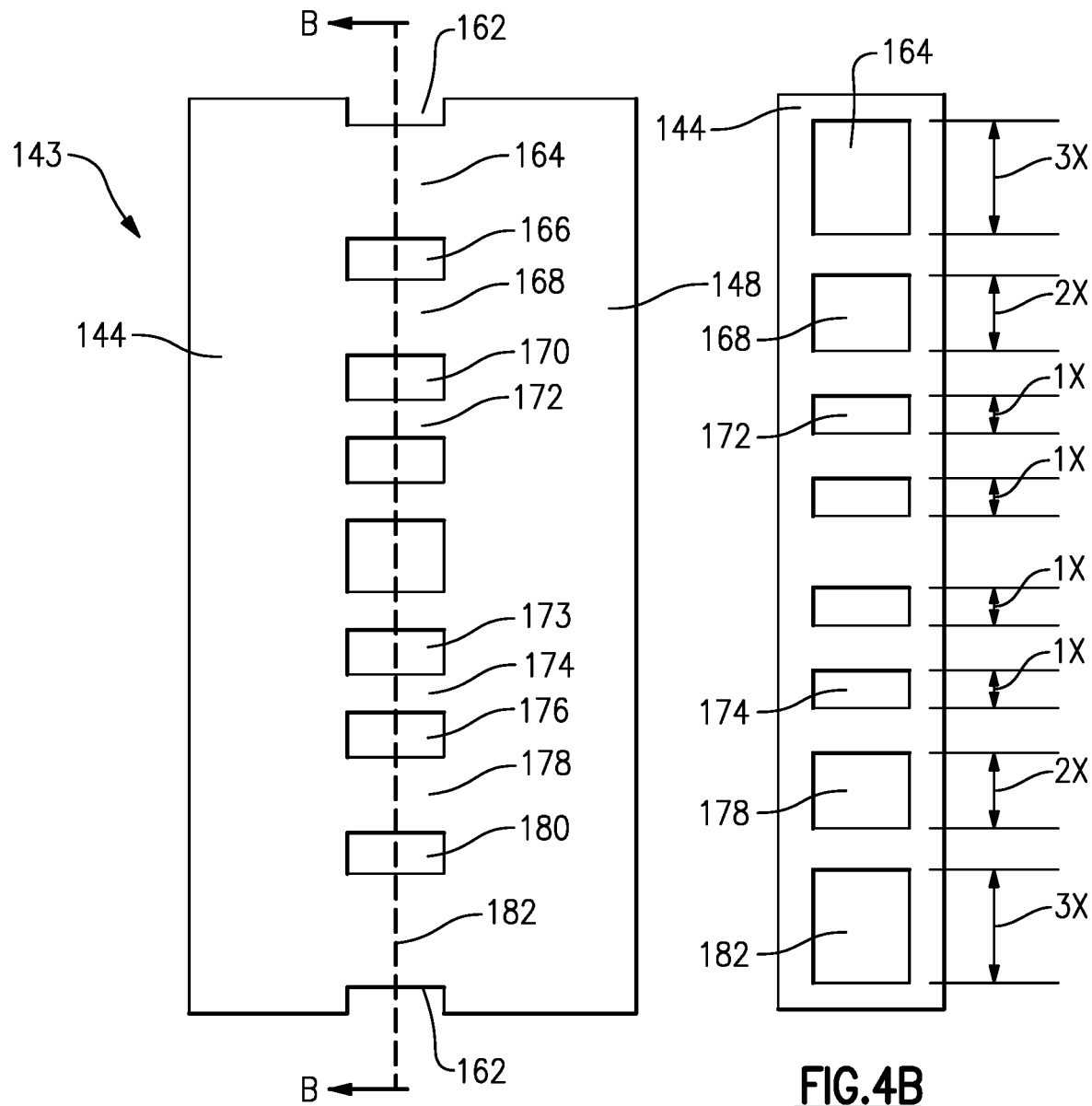
FIG. 4A shows a lost core.
FIG. 4B is a cross-sectional view along line B-B of FIG. 4A.

FIG. 4A shows the lost core 143. Leg 144 is connected to leg 148 by a plurality of crossover members. As known, the shape of the lost core will form the shape of cooling channels in the eventual product. The outer crossover members 164 and 182 could be called frames, in that, they extend for a greater cross-sectional area than do the more central members 172, 174, etc. The second most inward members 178 and 168 extend for a cross-sectional area intermediate that of member 164 and length 172. Again, the three cross-sectional areas may be at the ratio of 3:2:1, however, other relative cross-sectional areas would come within the scope of this application.

Hollows 162 in the core 143 receive metal at the outer ends of the molded part.

Hollows 180, 176, 170 and 166 receive molten metal to form the connectors 118, 122, 126 and 130 as described above. Hollows extend for a cross-sectional area that is less than the first and second cross-sectional area.

FIG. 4B is a cross-sectional view along line B-B of FIG. 4A. As shown, the members 164 and 182 extend for a greater cross-sectional area which will be a cross-sectional area than do the frames 168 and 178. More central members 172 and 174 extend for even less of a cross-sectional area.

Figure 5:
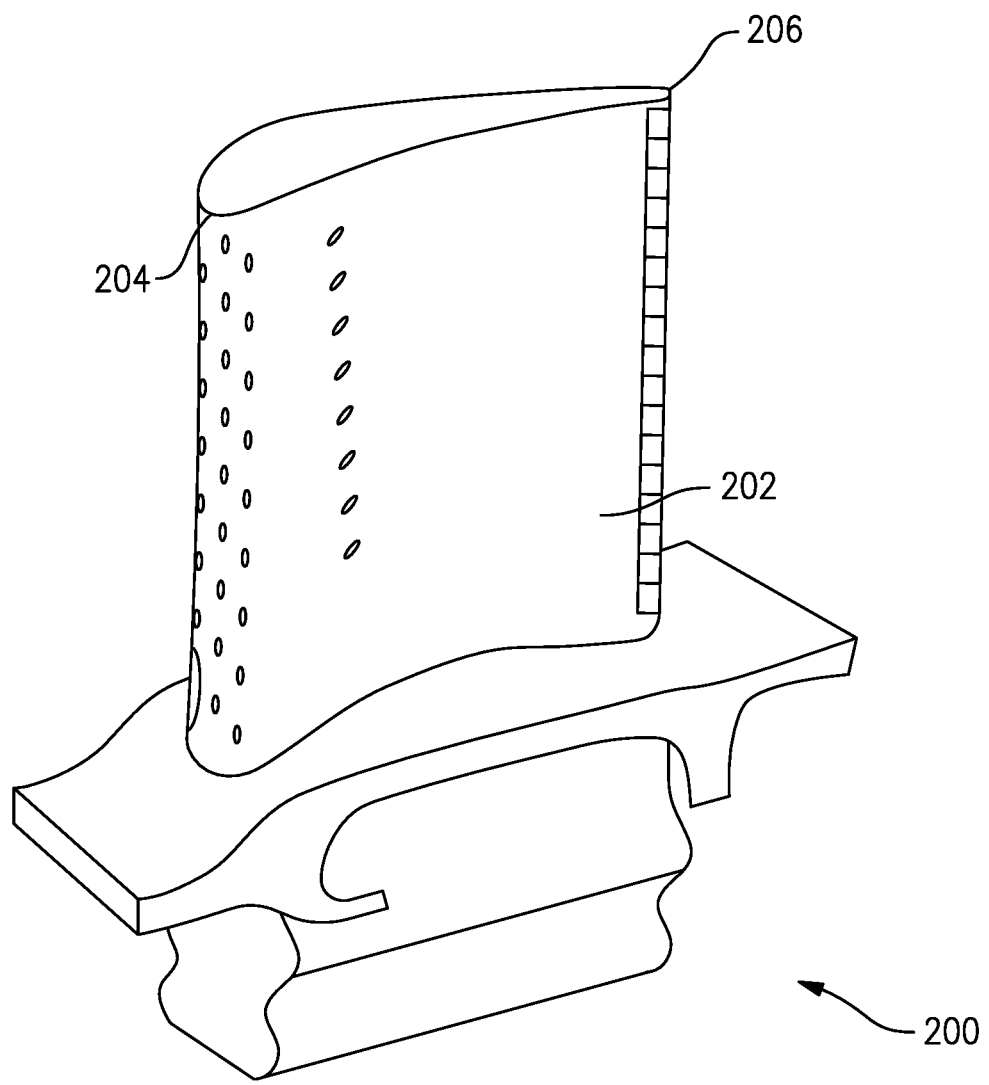
FIG. 5 shows another embodiment.

FIG. 5 shows a blade 200 having an airfoil 202 extending from a leading edge 204 to a trailing edge 206. While FIGS. 2 and 3 show the teachings of this application as formed in a static vane, it should be understood that the teachings would extend to a rotating blade 200 such as that shown in FIG. 5.

The use of the several thicker frame members ensures that the mold core 143 will be more rigid and less likely to break than the prior art. As further known, the mold cores may be formed of an appropriate material. A worker of ordinary skill in the art would recognize the materials generally utilized to form a lost core mold portion.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine engine component having an airfoil comprising:
    an airfoil extending between a leading edge and a trailing edge, and there being a first and a second cooling channel with said first cooling channel being spaced closest to one of said leading and trailing edges and said second channel being spaced from said first channel relative to said one of said leading and trailing edges, and crossover holes connecting said first and second cooling channels, with said plurality of crossover holes including outermost crossover holes spaced from each other at adjacent ends of each of said first and second cooling channels, second crossover holes spaced closer to each other than are said outermost crossover holes, and central crossover holes between said second crossover holes; and said outermost crossover holes extending for a first cross-sectional area, said second crossover holes extending for a second cross-sectional area and said central crossover holes extending for a third cross-sectional area, with said first cross-sectional area being greater than said second cross-sectional area and said second cross-sectional area being greater than said third cross-sectional area.

2. The gas turbine engine component as set forth in claim 1, wherein a ratio of said first cross-sectional area to said second cross-sectional area to said third cross-sectional area is 3:2:1.

3. The gas turbine engine component as set forth in claim 2, wherein film cooling holes extend from said first cooling channel through a skin of said component.

4. The gas turbine engine component as set forth in claim 3, wherein said at least one of said leading and trailing edge is said leading edge.

5. The gas turbine engine component as set forth in claim 4, wherein there are intermediate connectors between said outermost crossover holes and said crossover holes, and between said second crossover holes and said central crossover holes, and also between individual ones of said central crossover holes.

6. The gas turbine engine component as set forth in claim 5, wherein said intermediate connectors extend for a cross-sectional area that is less than said first and said second cross-sectional area.

7. The gas turbine engine component as set forth in claim 1, wherein film cooling holes extend from said first cooling channel through a skin of said component.

8. The gas turbine engine component as set forth in claim 1, wherein said at least one of said leading and trailing edge is said leading edge.

9. The gas turbine engine component as set forth in claim 1, wherein there are intermediate connectors between said outermost crossover holes and said crossover holes, and between said second crossover holes and said central crossover holes, and also between individual ones of said central crossover holes.

10. The gas turbine engine component as set forth in claim 1, wherein said intermediate connectors extend for a cross-sectional area that is less than said first and said second cross-sectional area.

11. A gas turbine engine comprising:
a compressor section and a turbine section, said turbine section including rotors carrying rotating blades and static airfoils with at least one of said rotating blades and said static airfoils including an airfoil extending between a leading edge and a trailing edge, and there being a first and a second cooling channel with said first cooling channel being spaced closest to one of said leading and trailing edges and said second channel being spaced from said first channel relative to said one of said leading and trailing edges, and crossover holes connecting said first and second cooling channels, with said plurality of crossover holes including outermost crossover holes spaced from each other at adjacent ends of each of said first and second cooling channels, second crossover holes spaced closer to each other than are said outermost crossover holes, and central crossover holes between said second crossover holes; and said outermost crossover holes extending for a first cross-sectional area, said second crossover holes extending for a second cross-sectional area and said central crossover holes extending for a third cross-sectional area, with said first cross-sectional area being greater than said second cross-sectional area and said second cross-sectional area being greater than said third cross-sectional area.

12. The gas turbine engine as set forth in 11, wherein a ratio of said first cross-sectional area to said second cross-sectional area to said third cross-sectional area is 3:2:1.

13. The gas turbine engine as set forth in claim 12, wherein said at least one of said leading and trailing edge is said leading edge.

14. The gas turbine engine as set forth in claim 13, wherein there are intermediate connectors between said outermost crossover holes and said second crossover holes, and between said second crossover holes and said central crossover holes, and also between individual ones of said central crossover holes.

15. The gas turbine engine as set forth in claim 14, wherein said intermediate connectors extend for a cross-sectional area that is less than said first and said second cross-sectional area.

16. The gas turbine engine as set forth in claim 11, wherein said at least one of said leading and trailing edge is said leading edge.

17. The gas turbine engine as set forth in claim 16, wherein there are intermediate connectors between said outermost crossover holes and said second crossover holes, and between said second crossover holes and said central crossover holes, and also between individual ones of said central crossover holes.

18. The gas turbine engine as set forth in claim 17, wherein said intermediate connectors extend for a cross-sectional area that is less than said first and said second cross-sectional area.

19. The gas turbine engine as set forth in claim 11, wherein there are intermediate connectors between said outermost crossover holes and said second crossover holes, and between said second crossover holes and said central crossover holes, and also between individual ones of said central crossover holes.

20. The gas turbine engine as set forth in claim 19, wherein said intermediate connectors extend for a cross-sectional area that is less than said first and said second cross-sectional area.

* * * * *